Figure 1:
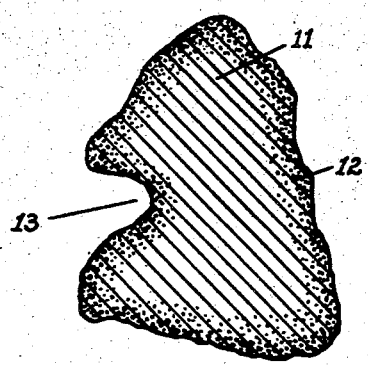

April 8, 1947.     H. N. BAUMANN, JR., ET AL     2,418,496
ALUMINA SOLID SOLUTIONS
Original Filed Oct. 14, 1943

INVENTORS.
RAYMOND C. BENNER
HENRY N. BAUMANN JR.
BY
ATTORNEY.

Patented Apr. 8, 1947

2,418,496

UNITED STATES PATENT OFFICE 2,418,496

ALUMINA SOLID SOLUTION

Henry N. Baumann, Jr., and Raymond C. Benner, Niagara Falls, N. Y., assignors to The Carborundum Company, Niagara Falls, N. Y., a corporation of Delaware Continuation of application Serial No. 506,226, October 14, 1943. This application October 25, 1944, Serial No. 560,230

24 Claims. (Cl. 106—65)

This invention relates to aluminous materials and particularly to alumina whose crystalline structure is modified by the presence of one or more other oxides in the alumina lattice.

It is an object of our invention to produce improved materials of this type by the use of modifying oxides crystallizing in the same general form as alpha alumina. It is a further object of our invention to provide a method for modifying the surface of alumina granules or articles.

A still further object of our invention is to provide improved abrasive and wear-resistant articles comprising crystalline alumina which has been modified by other oxides.

Alumina has long been used for abrasive and refractory purposes and several forms of alumina are in extensive use. Examples are natural corundum, the artificially produced form of aluminum oxide known as alpha alumina which is crystallographically identical with corundum and may be produced by fusing bauxite or other material high in alumina under reducing conditions in electric furnaces or by the fusion of alumina of high technical purity as made, for example by the Bayer process, and beta alumina.

The particular abrasive characteristics of such forms of alumina will vary somewhat depending upon the total alumina content, the amount and kind of associated impurities and the rate of cooling of the fused product. Under any conditions, however, such known products have certain limitations as regards uniformity, toughness, microstructure, and the degree to which their physical properties may be altered to fit different abrasive applications.

We have found that when alumina is modified with one or more metal oxides which crystallize in the same general form as alpha alumina and the crystalline dimensions of which are of the same order as those of alumina, the resulting change in crystal structure furnishes means whereby the physical properties of the crystalline alumina may be greatly varied. In the case of abrasive grain greatly increased hardness and great toughness may be secured.

As may be seen from the following table alpha alumina ($Al_2O_3$), chromium oxide ($Cr_2O_3$), vanadium oxide ($V_2O_3$), and ferric oxide ($Fe_2O_3$) all crystallize in the same system and have unit cells of similar dimensions and angles of the same order between any two of the three trigonal axes.

Table 1

| Substance | System | $\frac{a}{A}$ | $\alpha$ |
|---|---|---|---|
| $\alpha Al_2O_3$ | Hexagonal, Rhombohedral Division | 5.13 | 55°17' |
| $Cr_2O_3$ | | 5.35 | 54°58' |
| $V_2O_3$ | | 5.45 | 53°53' |
| $Fe_2O_3$ | | 5.42 | 55°17' |

In Table 1 the edge ($a$) of the unit cell is given in Angstrom units (A), that is $10^{-8}$ cm., and alpha ($\alpha$) is the angle between any two of the three trigonal axes. In each instance the unit cells contain the same number of atoms.

While all of the oxides listed in Table 1 will form solid solutions with alumina, the possible extent of such solution is not the same with all of the substances. For example, with chromium sesquioxide ($Cr_2O_3$) and alpha alumina, similar X-ray patterns are obtained over the entire range of compositions, thus showing that a continuous series of solid solutions is formed. The only material difference found in X-ray powder photographs taken of specimens containing different amounts of $\alpha Al_2O_3$ and $Cr_2O_3$, is in the increased distances between corresponding lines as the amount of chromium oxide is increased. This change is caused by an increase in size of the unit cell as atoms of chromium replace atoms of aluminum in the alpha alumina unit cell and is a result of the slightly greater ionic radius of chromium as compared with that of aluminum. This difference in size of the atoms or ions is also responsible for a slight distortion of the alumina lattice when other oxides are in solid solution which is believed to be the cause of the increased hardness that we have found in abrasive grain made from those solid solutions and may also account for the increased toughness of such grain. In both cases the comparison is with alpha alumina abrasive grain either as made previously by fusing bauxite or artificial aluminum ore or as found in the form of natural corundum.

While none of the oxides listed, other than chromium oxide, forms a continuous series of solid solutions with alpha alumina, each of them as well as manganese sesquioxide ($Mn_2O_3$) enters into solid solution in alumina to some extent and, in so doing produces an effect of the same nature as that produced by the entry of chromium sesquioxide into solid solution in alumina. Manganese sesquioxide, although not ordinarily crystallizing in the hexagonal system, has a radius ratio (the ratio of the radius of the manganese atom to the radius of the oxygen atom) so close to that of alumina that it can form solid solutions with the latter. While the amounts of vanadium, manganese and iron sesquioxides which will enter into solid solution in alumina are limited, nevertheless the increase in hardness may be even greater than is obtained with chromium oxide in solid solution because of greater distortion of the alumina unit cell.

Unlike chromium and vanadium sesquioxides, manganese and iron sesquioxides when completely fused with alumina (particularly under reducing conditions) tend to dissociate to a lower oxide state of the typical formula MeO and to form aluminates rather than to enter into solid solution in the alumina. However, when heated with alumina at sintering temperatures or somewhat below iron and manganese oxides enter into solid solution in the alumina to some extent. It should accordingly be remembered when manganese and iron oxides are referred to in this application that the use of these oxides to form solid solutions in alumina is only practicable by a process not involving fusion.

Advantages may be taken of the tendency of the above recited oxides to enter into solid solution in alumina by acting upon alumina in a number of ways. Thus, fusions of alumina and either chromium or vanadium oxides or both may be made with the production of a crystalline product which consists of a solid solution of the oxide or oxides in alumina. By another method alumina and one or more solid-solution-forming oxides, all in finely divided form, may be admixed and heated to sintering temperature with the product obtained consisting of sintered alumina containing the oxide or oxides in solid solution. It is also possible to treat alumina either in granula form or in the form of articles, such as shapes which have been molded or cast from finely divided alumina and sintered at a high temperature or which have been formed of fused alumina, so as to produce a layer, case, or thick film, of a solid solution of one or more other metal oxides in alumina at the surface of the granules or articles. In many cases this may be done without substantially changing the composition of the center of the granules or articles. For convenience in reference in the specification and claims, the production of such a layer or case will be called "case-treatment," the process by which "case-treatment" is produced will be called "case-treating," and the modified aluminous material or articles obtained by this process will be termed "case-treated."

Figure 2:
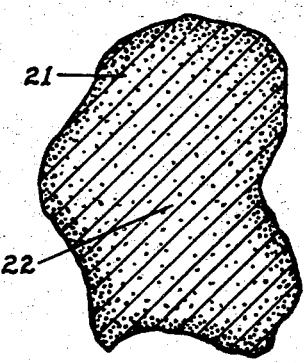
Figure 3:
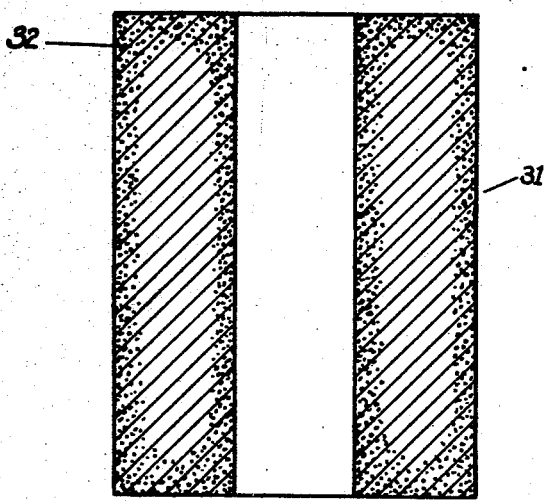

The accompanying drawings will assist in an understanding of case-treatment, Figures 1 and 2 being somewhat diagrammatic views of sections of alumina granules which have been case-treated in accordance with our invention, and Figure 3 being a sectional diagrammatic representation of an article, specifically a sintered alumina nozzle, which has been case-treated in accordance with our invention. A fuller description of the drawings will be presented hereafter in connection with a more detailed description of the case-treating process.

Where the alumina solid solutions are to be used for abrasive grain it is convenient to make fusions in an arc type of electric furnace such as is usually used in making fused alumina abrasive grain. When an electric furnace is used to fuse mixtures of alumina with solid-solution-forming oxides excessive reducing conditions must be avoided. Accordingly the raw materials must be low in carbon and are preferably carbon-free. However, if small amounts of carbide or free metal are formed by reduction, they may be eliminated by later heat treatment of the abrasive material. In carrying out such a fusion method we may allow the fused material to cool slowly in the furnace, thus forming a large ingot or pig, but we prefer to cast the molten magma into molds or pour it out into thin layers.

According to another method of forming alumina solid solutions, the alumina, white aluminum ore made by the Bayer process being particularly suitable, is mixed with a solid-solution-forming oxide. Both materials are used in finely powdered form, fine enough, for example, to pass through a screen having 200 meshes per linear inch. To this mixture a temporary binding medium such, for example, as dextrin may be added, as necessary, and the mixture is formed into blocks or shapes. These are then fired to a sufficiently high temperature to produce recrystalization which gives a product with a very dense structure.

In making abrasive grain from the fused product described above or from blocks of the sintered product, the process employed follows the usual crushing, screening and other steps used in commercial practice. We have found, however, that the alumina solid solution grain is particularly amenable to heat treatment and may be given such a treatment to improve its hardness, strength and toughness. In part at least we believe this is caused by the phenomenon of precipitation hardening.

Case-treatment of alumina granules or articles results, in accordance with our invention, from heating together such granules or articles and the metal oxide or oxides, in finely divided form, which it is desired to introduce into solid solution at the surface of the alumina. The heating is carried out at temperatures which are not only far below the melting point of alumina but are also well below the temperatures necessary to sinter alumina, the solid-solution-forming oxides or mixtures of the alumina and oxide or oxides. In fact the temperatures employed are so low that when granules of alumina have been case-treated they are very little aggregated and no substantial sintering together of the particles of alumina or other oxides is evident. Only gentle milling is required to separate case-treated granules to an extent which will permit substantially all of them to pass through screens of the same mesh size as those used in the separation of the original granules. The surface of case-treated alumina articles is also quite free from adhering particles and only a brushing is needed to remove such particles as do adhere.

We have found that the thickness of the case or layer of solid solution on the surface of alumina bodies is a function of the time and temperature of heating the alumina in contact with the solid-solution-forming oxide or oxides. The duration of heating and the temperatures employed in obtaining a given thickness of case, however, will depend upon the solid-solution-forming oxide or oxides used. Of course, when articles of alumina, such as sintered shapes, are being case-treated, the location and extent of the case will be primarily determined by the location and extent of the portion or portions of the articles in contact with the modifying oxide or oxides.

Examples I and II illustrate typical procedures by which alumina granules may be case-treated.

Example I

An amount of finely powdered vanadium pentoxide equal to 2% by weight of the quantity of alumina granules on which it is desired to form a case of $Al_2O_3$—$V_2O_3$ solid solution, is mixed with sufficient water to form a thin slurry. After thoroughly mixing the slurry with a predetermined quantity of 36 mesh alumina granules the mixture is dried and pressed in a refractory container and heated for one hour at 1200° C. After cooling to room temperature the product is pressed through a 36 mesh screen which serves to break up the few aggregates which may be formed by the cohesion of the granules. The resulting product is a case-treated granular alumina material of substantially the same particle size as the original alumina particles. The granules of the product have a structure like that shown in Figure 1 of the drawings.

In the product made according to Example I, the portion of the particles corresponding to the portion indicated at 12 in Figure 1, is a solid solution of vanadium sesquioxide ($V_2O_3$) in alumina.

Example II

Where it is desired to form on alumina granules a case of solid solution containing a plurality of other metal oxides in alumina, the finely divided oxides, for example $V_2O_5$ and $Fe_2O_3$, may be mixed with water to form a thin slurry as in Example I. The slurry in appropriate amounts is then added to the calculated quantity of alumina granules. Subsequent treatment of the mixture is like that in Example I, a temperature of about 1300° C. being used for 1½ hours. The product obtained is a mass of alumina granules having a solid solution case containing both $V_2O_3$ and $Fe_2O_3$.

The products resulting from the foregoing specific example are granular in nature and have in general a structure like that shown in Figure 1 of the drawings. In Figure 1 is shown diagrammatically a section of an alumina granule which has been so case-treated that the center of the granule is substantially unchanged, that is, the solid solution does not extend beyond a shell on the surface of the granule. The case-treated granule consists of an inner core 11, of substantially unaltered alumina, surrounded by a case or layer 12 of a solid solution of one or more other metal oxides in alumina.

The concentration of the metal oxide or oxides in the solid solution case or layer of course varies, being greater in the exterior and becoming progressively less toward the interior of the granule. The decreasing concentration of the metal oxide or oxides in solid solution in the alumina is indicated graphically by the concentration of the dots in case 12. As will be noted, there is no sharp boundary between the case or layer of solid solution and the substantially unaltered interior of the granule since diffusion will not be uniform in all directions in the crystalline granule. At 13 is indicated a dimple or depression in the granule and it will be seen that the solid solution is formed in the depression to a considerable depth.

As previously mentioned the depth or thickness of the solid solution case on alumina bodies depends upon the time and temperature of heating. Thus, by varying the time or temperature of heating, or both, the thickness of the coating may be varied to any desired degree. The temperatures which we prefer lie between about 1100° C. and 1500° C. The time of heating will course vary with the temperature used, but in general at the preferred temperatures mentioned above, a heating period of ½ to 2 hours is sufficient.

Control of the depth or thickness of the case as well as its composition may also be obtained by varying the amounts of solid-solution-forming oxides used. In general we have found that about 1 to 5% of a solid-solution-forming oxide is satisfactory and care should be taken to avoid an excess of oxide or oxide-forming material since if too much is used the undissolved remainder will contaminate and in some cases adhere to the case-treated bodies.

It is not always possible to so treat granules of alumina that the interior of the granule is entirely unaltered. Thus, where granules of small size are used, it is usually the case that at least some which are in more intimate contact with the solid-solution-forming oxide or oxides will have a certain amount of the other oxide or oxides in solid solution even in the interior of the granules. Where the alumina granules are very small the difficulties of proper regulation are such that generally the whole granule will be converted to solid solution.

Figure 2 of the drawings illustrates diagrammatically a sectional view of an alumina granule, case-treatment of which has been carried out under such conditions that the central portion of the granule has been somewhat altered by the presence of the solid-solution-forming oxide although the amount of alteration present at and near the center of the granule is very much less than that at the surface. In some cases the solid-solution-forming oxide may be present at the center in barely detectable amount. As will be seen, the concentration of dots representing graphically the concentration of solid solution decreases markedly from the outer portion of the granule indicated generally at 21 to the center of the granule indicated at 22.

The following example describes the case-treatment of an alumina article, to impart increased toughness, hardness and wear-resistance to the surface.

Example III

A nozzle for a sand-blasting apparatus formed by a known sintering procedure from fine alumina powder may have the wear receiving portion thereof hardened and toughened by applying to the interior of the nozzle a fairly thin coating of a slurry of a solid-solution-forming oxide (such as $V_2O_5$) in water and heating the nozzle for a period of from ½ to 1 hour at approximately 1200° C. After this treatment it will be found that a case has been formed on a surface of the nozzle where the solid-solution-forming oxide slurry had been applied, the case being a solid solution of the oxide in alumina.

When the entire article is likely to be subjected to shock or when it is more convenient, the entire surface of the article may be coated with the slurry of solid-solution-forming oxide or the nozzle may be packed in the solid-solution-forming oxide in very finely divided form and heated in contact therewith. It will, of course, be obvious that the usefulness of this treatment is not limited to sand-blast nozzles but that the treatment may be applied to any sintered alumina article in which the improved properties obtained by case-treatment are desirable.

In Figure 3 is shown a diagrammatic sectional view of a sand-blast nozzle 31 which has been case-treated in accordance with our invention. The nozzle represented in Figure 3 has been case-treated over its entire surface and the concentration of solid solution indicated generally at 32 at and near the surface is shown graphically by the concentration of dots.

The method of Example III is particularly applicable to the improvement of sintered alumina articles which are subject in use to wear or abrasion such as, for example, besides sand-blasting nozzles, pistons, valves, thread guides and extrusion devices. It is also possible to case-treat and thus increase the toughness of sintered alumina articles subject to high mechanical stress such as drawing dies, machining and cutting tools and mounts therefor, drills, and the like with highly desirable results.

In a manner somewhat analogous to the case-treatment methods described above finely divided alumina (which, as has been pointed out above, is difficult if not impossible to treat so as to obtain only a surface case of solid solution) may be so treated as to convert the entire body of the alumina particles to a solid solution and then be sintered in accordance with well-known or desired procedures to form hard, tough articles composed of an alumina solid solution.

While we do not wish to be bound thereby we believe that the probable mechanism of the case-treatment is as follows:

When the alumina articles or granules are coated with metal oxide and heated to a relatively high temperature, atoms of the metal or metals, the oxide or oxides of which are used, migrate across the boundary between the oxide and alumina and replace aluminum atoms in the crystal lattice of the alumina. This action is progressive, first taking place at the surface, and continuing with sustained heating, the solid solution being formed in lower concentration nearer and nearer the center of the granules or articles. As the interchange goes on, there is of course a tendency for the other metal atoms to become evenly distributed and hence upon long continued heating or in a shorter time with particles of small size the product obtained will be converted to a homogeneous solid solution of the other metal oxide in alumina.

Whatever the correct theory of the formation of the solid solution case on the alumina bodies, there is no room for doubt that such a layer of solid solution exists since Debye-Scherrer X-ray photograms of powdered samples of case-treated alumina made in accordance with our process show definite shifts in the pattern lines from the normal alumina pattern. Shifts of this type can be explained only by the presence of solid solutions. Examination of our case-treated alumina under the petrographic microscope reveals a color change of the alumina adjacent the surface. This change indicates the absorption of other metal oxides. Additional evidence is found in the fact that refractive index determinations of case-treated alumina show an index differing from that of untreated alumina.

The solid-solution-forming oxides with which it is desired to modify the alumina either in forming masses of solid solutions or in case-treating articles or granules of alumina may be supplied in a number of ways. Of course, the pure oxides $Cr_2O_3$, $V_2O_3$, $Mn_2O_3$ and $Fe_2O_3$ may be used but in many cases it will be found more convenient to use other and more readily obtainable or cheaper sources of materials. We have found that many other sources of these oxides may be used satisfactorily. Thus, oxides of other compositions, such as $V_2O_5$ instead of $V_2O_3$, or salts which will break down to solid-solution-forming oxides under the conditions of the process may be used. It is also possible to use oxides or compositions which contain considerable impurities. For example, chromite may be used as a source of chromium oxide even when containing, as an impurity, 40% or more $Al_2O_3$, and ores, such for example, as vanadium ore containing no more than 10% $V_2O_5$, may be employed.

In general, purer oxides or compositions will be used when forming solid solutions by sintering or when the oxides are to be used for case-treating alumina while the more impure materials may be satisfactorily used when forming solid solutions by fusion.

When ores or other oxide sources are used the residual material in the ore or impurities will form a matrix material associated with the alumina metal-oxide solid solution. This is particularly noticeable when the fusions are made in small sized pieces by a casting process or when sintering is employed. Where matrix material is present it should in general not exceed about 10% of the composition of the alumina metal-oxide solid solution since in greater amounts the continuity of the product may be interrupted to an objectionable extent.

As previously pointed out chromium oxide and alumina form a continuous series of solid solutions whereas the other metal oxides mentioned enter into solid solution to a limited extent only. Consequently where an excess of an oxide, even a pure oxide, is used above that amount which will form a solid solution with alumina, the excess oxide will constitute a matrix material in a manner similar to the matrix formed by impurities.

While of perhaps secondary importance to the fact that we have found a way of commercially varying the properties of alumina abrasives by modifying the alpha alumina unit cell itself, the presence of included or interstitial matter, that is, matrix material, produces a further improvement in some instances. As an example, when a fusion, instead of being allowed to cool in a mass and thus form large crystals, is poured out in thin layers or to form shapes having small areas of cross section such as small blocks, it cools quickly, and crystal growth is inhibited. Under such conditions the matrix material is well dispersed in the cast mass and it may be observed petrographically as included and interstitial impurities associated with fine crystalline alumina metal-oxide solid solution. The presence of matrix-forming materials is chiefly useful when the grain is heat treated by roasting as a later step in its preparation for use as abrasive grit, the heat treatment causing the grains to become tougher, a desirable property in certain abrasive operations.

Where the alumina metal-oxide solid solutions are to be produced by sintering still another source of the metal-oxide may be used, that is the finely divided metal itself. Under oxidizing conditions the metal will be transformed to the oxide and form a solid solution.

It is of course obvious that since by other metal-oxides entering into the unit cell of crystalline alpha alumina the physical structure and consequently the physical properties of the crystal are fundamentally altered the abrasive properties of the alumina metal-oxide solid solution crystals are different from the alpha alumina.

In the abrasive art it is now well-recognized that the grinding, polishing or other working by abrasive processes of different materials requires for best results a fitting of the abrasive to the material for the particular process and that as a result a wide variety of abrasive media is required. We have found that the changing of the crystalline character of alumina by the introduction of oxides which form solid solutions with alumina is a useful tool for producing a large number of varieties of abrasive grain with different microstructures, fractures, toughness, bonding properties, and other physical properties. The range of varieties will be better appreciated when it is remembered that, besides the solid solutions in alumina of $Cr_2O_3$, $V_2O_3$, $Fe_2O_3$, and $Mn_2O_3$, solid solutions in alumina of mixtures of one or more of $V_2O_3$, $Fe_2O_3$, and $Mn_2O_3$ with $Cr_2O_3$, mixtures of one or both of $Mn_2O_3$ and $Fe_2O_3$ with $V_2O_3$, and mixtures of $Mn_2O_3$ and $Fe_2O_3$ may be employed.

Abrasive grain formed from alumina metal-oxide solid solutions is applicable to a number of abrasive uses in both bonded and coated abrasives. In general, alumina grain with only small amounts of added solid-solution-forming oxides is more suitable for abrasive articles such as grinding wheels with ceramic or vitrified bonds, wheels of this type showing particularly good strength in speed tests and the additional hardness of the abrasive over normal alumina abrasive being an important factor. Such grain has also the sharpness and strength required for coated abrasives such as are used, for example, in woodworking and metal grinding having either glue or resin adhesives. Abrasive grain made from heat-treated fused cast material with higher amounts of added solid-solution-forming oxides, and sometimes matrix material, appears preferable for use in making articles with resin bonds. We do not, however, limit ourselves to any particular uses for the improved aluminous abrasives, since our invention broadly covers the distinctly new class of alumina abrasive compositions disclosed herein.

Alumina abrasive grain which has been case-treated by the process of our invention possesses certain differences over the abrasive grain in which the solid solution is uniformily distributed. In many instances these differences are advantageous since, due to the fact that the grain surface has properties different from those of the center or core of the grain, the fracture of the grain will be more irregular, and since greater variation of the properties of the treated grain from the norm of the untreated grain is obtainable. Other advantages of the case-treatment of preformed grain over the production of grain from a mass of alumina solid solution are the avoidance of loss of the product as fines and the possibility of using considerably smaller quantities of the oxides for treatment while producing abrasive grain having desirable properties similar to the grain made from a mass of alumina solid solution.

The case-treated abrasive grain obtained by the method of our invention is very tough, its toughness exceeding that of untreated alumina grain or even alumina grain which has been heated to the same temperature as that used in our process. The following table shows the comparative crushing strengths of various alumina grain samples:

| Grain Type | Average Resistance to Crushing |
|---|---|
| | Pounds |
| Pure alumina grain (unheated) | 30.4 |
| Pure alumina grain (heated to 1200° C.) | 24.1 |
| Alumina grain case-treated 1 hr. at 1200° C. with 2% $V_2O_5$ | 34.9 |
| Alumina grain case-treated 1 hr. at 1200° C. with 2% $Fe_2O_3$ | 34.8 |
| Alumina grain case-treated 1 hr. at 1200° C. with 2% $V_2O_5$ and $Fe_2O_3$ | 39.6 |

These tests were made on single 16 grit grains on a testing machine in which the grain was placed between two tables and crushed by pressure. The results of this test are believed to indicate to a considerable extent the relative toughness of the abrasive grain and they show that the case-treatment has considerably increased the toughness.

The amounts of solid-solution-forming oxides employed may vary over a wide range. Of course, when making a mass of an alumina solid solution the presence of excess solid-solution-forming oxide is often unobjectionable since except in the case of chromium which forms solid solutions in all proportions with aluminum, the excess oxide will appear in the product as matrix material. We have found, however, that a desirable degree of hardness and toughness can be obtained with an amount of solid-solution-forming oxide of from about ¼ to about 10 or 20%, depending upon the solubility of the oxide. In cases where no matrix material is desired or where it is desired not to contaminate the final product, as in case-treating alumina grain, the amounts of solid-solution-forming oxides used may be more carefully regulated and smaller. In the case-treatment of alumina grain an amount of solid-solution-forming oxide equivalent to from about ¼ to about 5% of the weight of the alumina is generally satisfactory. With very large alumina granules or with shaped alumina articles it is frequently a matter of convenience to use somewhat more solid-solution-forming oxide or oxides since the time necessary for case-treatment will be somewhat decreased.

In accordance with our invention physical properties of aluminous grain may be varied in one or more of the following ways:

(1) We may vary the kind of material going into solid solution.

(2) We may vary the amount of material in solid solution.

(3) We may vary the kind and amount of matrix material.

(4) We may vary the location of the material in solid solution.

(5) We may, by heat treatment, vary the hardness and toughness.

Where percentages are given in the specification and the claims it will be understood that percentages by weight are meant unless it is otherwise specified.

Where in the appended claims we refer to solid-solution-forming oxides or to $Cr_2O_3$, $Fe_2O_3$, $V_2O_3$ and $Mn_2O_3$ we mean to include, where the context permits, materials for example, salts, other oxides and the metals themselves, which under the conditions of the process form these oxides or other oxides of the named metals which enter into solid solution in alumina. By the unmodified term "alumina" we mean any form of alumina except where a contrary intention is indicated. Where the expression "essentially crystalline alumina" is used in the claims it is meant by this expression to denote crystalline alumina containing only the small amounts of impurities present in the alumina body before case-treatment. This application is a continuation of our copending application, Serial No. 506,226, filed October 14, 1943.

Other uses of our invention will no doubt be appreciated by those skilled in the art and accordingly we do not wish to be limited except by the scope of the accompanying claims.

We claim:

1. As a new article of manufacture, abrasive grain comprising alumina containing in solid solution $V_2O_3$.

2. As an abrasive grain, alumina which contains in solid solution $V_2O_3$ and with which is associated as inclusions and interstitially a matrix material.

3. A modified alumina body consisting of an interior portion which is essentially crystalline $Al_2O_3$ and a surrounding layer, integral therewith, comprising a solid solution of at least one oxide selected from the group consisting of $CR_2O_3$, $V_2O_3$, $Fe_2O_3$ and $Mn_2O_3$ in crystalline alumina.

4. A modified alumina body consisting of an interior portion which is essentially crystalline $Al_2O_3$ and a surrounding layer, integral therewith, comprising a solid solution of $Cr_2O_3$ in crystalline alumina.

5. A modified alumina body consisting of an interior portion which is essentially crystalline $Al_2O_3$ and a surrounding layer, integral therewith, comprising a solid solution of $V_2O_3$ in crystalline alumina.

6. A modified alumina body consisting of an interior portion which is essentially crystalline $Al_2O_3$ and a surrounding layer, integral therewith, comprising a solid solution of $Mn_2O_3$ in crystalline alumina.

7. A case-treated alumina body consisting of a core and a case, surrounding and integral with said core, said case comprising a solid solution of at least one metal oxide selected from the group consisting of $Cr_2O_3$, $V_2O_3$, $Fe_2O_3$ and $Mn_2O_3$ in crystalline alumina and said core being essentially crystalline alumina free from the solid solution.

8. A body consisting principally of crystalline alumina having in solid solution therein at least one oxide selected from the group consisting of $Cr_2O_3$, $V_2O_3$, $Fe_2O_3$ and $Mn_2O_3$, the concentration of the solid solution forming oxide decreasing from the surface of the body to a barely detectable concentration at the center thereof.

9. A body consisting principally of crystalline alumina having in solid solution therein $Cr_2O_3$, the concentration of the latter decreasing from the surface of the body to a barely detectable concentration at the center thereof.

10. A body consisting principally of crystalline alumina having in solid solution therein $V_2O_3$, the concentration of the latter decreasing from the surface of the body to a barely detectable concentration at the center thereof.

11. A body consisting principally of crystalline alumina having in solid solution therein $Mn_2O_3$, the concentration of the latter decreasing from the surface of the body to a barely detectable concentration at the center thereof.

12. A case-treated crystalline alumina granule consisting of a core portion and a surrounding case, integral therewith, comprising a solid solution of at least one metal oxide selected from the group consisting of $Cr_2O_3$, $V_2O_3$, $Fe_2O_3$, $Mn_2O_3$ in crystalline alumina, the amount of metal oxide in solid solution ranging from the smallest useful amount up to about 5%.

13. A case-treated crystalline alumina granule consisting of a core portion and a surrounding case, integral therewith, comprising a solid solution of $Cr_2O_3$ in crystalline alumina, the amount of $Cr_2O_3$ in solid solution ranging from the smallest useful amount up to about 5%.

14. A case-treated crystalline alumina granule consisting of a core portion and a surrounding case, integral therewith, comprising a solid solution of $V_2O_3$ in crystalline alumina, the amount of $V_2O_3$ in solid solution ranging from the smallest useful amount up to about 5%.

15. A case-treated crystalline alumina granule consisting of a core portion and a surrounding case, integral therewith, comprising a solid solution of $Mn_2O_3$ in crystalline alumina, the amount of $Mn_2O_3$ in solid solution ranging from the smallest useful amount up to about 5%.

16. The method of treating alumina bodies which comprises heating a crystalline alumina body with at least a portion of the surface thereof in contact with at least one finely divided metal oxide selected from the group consisting of $Cr_2O_3$, $V_2O_3$, $Fe_2O_3$ and $Mn_2O_3$ at a temperature below the sintering points of the alumina and other metal oxides for a period of time sufficient to cause the metal oxide or oxides to enter into solid solution in the crystalline alumina.

17. The method of treating alumina bodies which comprises heating a crystalline alumina body with at least a portion of the surface thereof in contact with finely divided $Cr_2O_3$ at a temperature below the sintering points of the alumina and $Cr_2O_3$ for a period of time sufficient to cause the $Cr_2O_3$ to enter into solid solution in the crystalline alumina.

18. The method of treating alumina bodies which comprises heating a crystalline alumina body with at least a portion of the surface thereof in contact with finely divided $V_2O_3$ at a temperature below the sintering points of the alumina and $V_2O_3$ for a period of time sufficient to cause the $V_2O_3$ to enter into solid solution in the crystalline alumina.

19. The method of treating alumina bodies which comprises heating a crystalline alumina body with at least a portion of the surface thereof in contact with finely divided $Mn_2O_3$ at a temperature below the sintering points of the alumina and $Mn_2O_3$ for a period of time sufficient to cause the $Mn_2O_3$ to enter into solid solution in the crystalline alumina.

20. The method of case-treating granular crystalline alumina which comprises heating a mixture of granular crystalline alumina and at least one finely divided metal oxide selected from the group consisting of $Cr_2O_3$, $V_2O_3$, $Fe_2O_3$ and $Mn_2O_3$ at a temperature below the sintering points of the alumina and other metal oxides for a period of time sufficient to form a case of a solid solution of crystalline alumina and other metal oxide or oxides around a substantially unchanged core of crystalline alumina.

21. The method of case-treating granular crystalline alumina which comprises heating a mixture of granular crystalline alumina and finely divided $Cr_2O_3$ at a temperature below the sintering points of the alumina and $Cr_2O_3$ for a period of time sufficient to form a case of a solid solution of crystalline alumina and $Cr_2O_3$ around a substantially unchanged core of crystalline alumina.

22. The method of case-treating granular crystalline alumina which comprises heating a mixture of granular crystalline alumina and finely divided $V_2O_3$ at a temperature below the sintering points of the alumina and $V_2O_3$ for a period of time sufficient to form a case of a solid solution of crystalline alumina and $V_2O_3$ around a substantially unchanged core of crystalline alumina.

23. The method of case-treating granular crystalline alumina which comprises heating a mixture of granular crystalline alumina and finely divided $Mn_2O_3$ at a temperature below the sintering points of the alumina and $Mn_2O_3$ for a period of time sufficient to form a case of a solid solution of crystalline alumina and $Mn_2O_3$ around a substantially unchanged core of crystalline alumina.

24. The method of case-treating granular crystalline alumina which comprises heating a mixture of granular crystalline alumina and at least one finely divided metal oxide selected from the group consisting of $Cr_2O_3$, $V_2O_3$, $Fe_2O_3$ and $Mn_2O_3$ at a temperature below the sintering points of the alumina and other metal oxides for a period of time sufficient to form a case of a solid solution of crystalline alumina and other metal oxide or oxides around a substantially unchanged core of crystalline alumina, the total amount of other metal oxide or oxides ranging from the smallest useful amount up to about 5%.

HENRY N. BAUMANN, JR.
RAYMOND C. BENNER.

REFERENCES CITED

The following references are of record in the file of this patent:

UNITED STATES PATENTS

| Number | Name | Date |
|---|---|---|
| 1,247,337 | Saunders et al. | Nov. 20, 1917 |
| 1,268,532 | Allen | June 4, 1918 |
| 1,240,490 | Saunders et al. | Sept. 18, 1917 |
| 1,402,714 | Brockbank | Jan. 3, 1922 |
| 1,042,878 | Blouin | Oct. 29, 1912 |
| 2,203,770 | Benner et al. | June 11, 1940 |
| 1,269,223 | Saunders | June 11, 1918 |
| 930,376 | Higgins | Aug. 10, 1909 |
| 2,152,656 | McDougal et al. | Apr. 4, 1939 |
| 2,218,584 | McDougal | Oct. 22, 1940 |
| 2,270,607 | Ryschkewitsch | Jan. 20, 1942 |
| 2,311,228 | Heany | Feb. 16, 1943 |
| 1,161,620 | Coulter | Nov. 23, 1915 |

FOREIGN PATENTS

| Number | Country | Date |
|---|---|---|
| 25,393 | British | 1903 |